(12) United States Patent
Kitaori et al.

(10) Patent No.: US 7,635,318 B2
(45) Date of Patent: Dec. 22, 2009

(54) AUTOMATIC TRANSMISSION SHIFT CONTROL APPARATUS AND METHOD

(75) Inventors: Ichiro Kitaori, Nagoya (JP); Hiroyuki Sawada, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 228 days.

(21) Appl. No.: 11/926,763

(22) Filed: Oct. 29, 2007

(65) Prior Publication Data

US 2008/0119327 A1 May 22, 2008

(30) Foreign Application Priority Data

Nov. 21, 2006 (JP) ............... 2006-314366

(51) Int. Cl.
*B60W 10/04* (2006.01)
*G06F 7/00* (2006.01)
(52) U.S. Cl. ........................ 477/115; 701/58
(58) Field of Classification Search ................. 477/115, 477/116; 701/55, 58, 59
See application file for complete search history.

(56) References Cited

U.S. PATENT DOCUMENTS 6,295,498 B1 * 9/2001 Gleason et al. ............... 701/55
6,421,596 B2 * 7/2002 Lee ............................. 701/51
6,684,144 B2 * 1/2004 Sekii et al. ................... 701/51
2004/0153232 A1 * 8/2004 Wada et al. ................... 701/55

FOREIGN PATENT DOCUMENTS

| JP | 8-226535 | 9/1996 |
| JP | 9-280351 | 10/1997 |
| JP | 2002-327834 | 11/2002 |
| JP | 2004-218799 | 8/2004 |

* cited by examiner

*Primary Examiner*—Roger Pang
(74) *Attorney, Agent, or Firm*—Oblon, Spivak, McClelland, Maier & Neustadt, L.L.P.

(57) ABSTRACT

An automatic transmission shift control apparatus includes a shift point learning-correcting unit and a high acceleration time upshifting unit. The shift point learning-correcting unit executes learning-correction of a shift point during an upshift such that an input rotational speed of the automatic transmission reaches a predetermined target maximum rotational speed. The high acceleration time upshifting unit executes, when predetermined high acceleration is requested, an upshift control based on the shift point in which a learning value of the shift point learning-correcting unit is reflected. When the high acceleration is not requested, the upshift control is performed based on a reference value of the shift point in which the learning value of the shift point learning-correcting unit is not reflected. The shift point learning-correcting unit executes the learning-correction of the shift point when the learning value is reflected in the upshift control.

3 Claims, 8 Drawing Sheets

| POSITION | | CLUTCH & BRAKE | | | | | | | O.W.C. | |
|---|---|---|---|---|---|---|---|---|---|---|
| | | C1 | C0 | C2 | B1 | B2 | C3 | B3 | F1 | F2 |
| N,P | | × | × | × | × | × | × | ○ | × | × |
| R | | × | × | ○ | × | ○ | × | ○ | × | × |
| D | 1st | ○ | × | × | × | × | × | ○ | ○ | △ |
| | 2nd | ○ | × | × | ○ | × | × | ○ | × | △ |
| | 3rd | ○ | ○ | × | × | × | × | ○ | × | △ |
| | 4th | × | ○ | × | ○ | × | × | ○ | × | △ |
| | 5th | × | ○ | × | ○ | × | ○ | × | × | × |
| | 1st ENGINE BRAKE | ○ | × | × | × | ○ | × | ○ | △ | △ |

AUTOMATIC TRANSMISSION SHIFT CONTROL APPARATUS AND METHOD

INCORPORATION BY REFERENCE

The disclosure of Japanese Patent Application No. 2006-314366 filed on Nov. 21, 2006 including the specification, drawings and abstract is incorporated herein by reference in its entirety.

BACKGROUND OF THE INVENTION

1. Field of Invention

The present invention relates to an automatic transmission shift control apparatus and method. In particular, the invention relates to a technology that prevents an overrun of an input rotational speed due to inappropriate learning of a shift point when learning-correction of an upshift point is performed such that the input rotational speed reaches a target maximum rotational speed.

2. Description of the Related Art

A conventional automatic transmission shift control apparatus includes: (a) a shift-point learning-correcting unit that executes learning-correction of an upshift point so that the input rotational speed reaches a predetermined target maximum rotational speed; and (b) a high acceleration upshifting unit that controls, when predetermined high acceleration is requested, the upshift based on a shift point in which a leaning value of the shift point learning-correcting unit is reflected. Japanese Patent Application Publication No. 2004-218799 describes an example of the conventional shift control apparatus. The shift control apparatus described in Japanese Patent Application Publication No. 2004-218799 calculates a virtual maximum rotational speed for a turbine, which is a maximum rotational speed of the turbine when a turbine rotational speed changes at a predetermined reference rotational speed change rate, based on the turbine rotational speed (input rotational speed) when an upshift command is issued, lag time from the issuing of the upshift command to a starting of an inertia phase, and the reference rotational speed change rate. The shift control apparatus then executes, when high acceleration is requested, learning-correction of the shift point (vehicle speed) such that the virtual maximum rotational speed approaches the target maximum rotational speed. Several other conventional shift control apparatuses also perform learning-correction of the shift point directly or indirectly, for example, by using the actual change rate of the turbine rotational speed as a parameter, or by learning the lag time to correct the shift point indirectly.

Even in the shift control apparatuses that perform the learning-correction of the shift point when the high acceleration is requested, the upshift is performed based on a reference value of the shift point in which the learning value of the shift point learning-correcting unit is not reflected when the high acceleration is not requested. However, if the learning-correction of the shift point is performed when the upshift is performed based on the reference value of the shift point, an error will be generated in the learning value. As such, if a mismatch exists between the reflection of the learning value in the shift control and the learning of the shift point, inappropriate learning will occur to cause an overrun of the input rotational speed or a driving power source.

SUMMARY OF THE INVENTION

The present invention provides an automatic transmission shift control apparatus and method for preventing an overrun of an input rotational speed due to inappropriate learning of a shift point when learning-correction of an upshift point is performed such that the input rotational speed reaches a target maximum rotational speed.

A first aspect of the present invention relates to an automatic transmission shift control apparatus. The automatic transmission shift control apparatus includes: a shift point learning-correcting unit that executes learning-correction of a shift point during an upshift such that an input rotational speed of the automatic transmission reaches a predetermined target maximum rotational speed; and a high acceleration time upshifting unit that executes, when predetermined high acceleration is requested, an upshift control based on the shift point in which a learning value of the shift point learning-correcting unit is reflected, wherein when the high acceleration is not requested, the upshift control is executed based on a reference value of the shift point, which does not reflect the learning value of the shift point learning-correcting unit; and the shift point learning-correcting unit executes the learning-correction of the shift point when the learning value is reflected in the upshift control.

In the shift control apparatus according to the first aspect of the present invention, the shift point learning-correcting unit executes learning-correction of the shift point when the learning value is reflected in the upshift control, that is, where the shift control is executed by the high acceleration time upshifting unit. Therefore, inappropriate learning caused by the mismatch between the reflection of the learning value in the shift control and the learning-correction of the shift point is prevented and an overrun of the input rotational speed caused by the inappropriate learning is also prevented.

The second aspect of the invention relates to an automatic transmission control method. The method includes: executing learning-correction of a shift point during an upshift such that an input rotational speed of an automatic transmission reaches a predetermined target maximum rotational speed; and executing an upshift control based on the shift point in which a learning value obtained by the learning-correaction is reflected, when predetermined high acceleration is requested, wherein: when the high acceleration is not requested, the upshift control is executed based on a reference value of the shift point, which does not reflect the learning value; and the learning-correction of the shift point is executed when the learning value is reflected in the upshift control.

BRIEF DESCRIPTION OF THE DRAWINGS

The above and other features and advantages of the present invention will become apparent from the following description of example embodiments given in conjunction with the accompanying drawings, in which.

DETAILED DESCRIPTION OF THE EMODIMENTS

Figure 1:
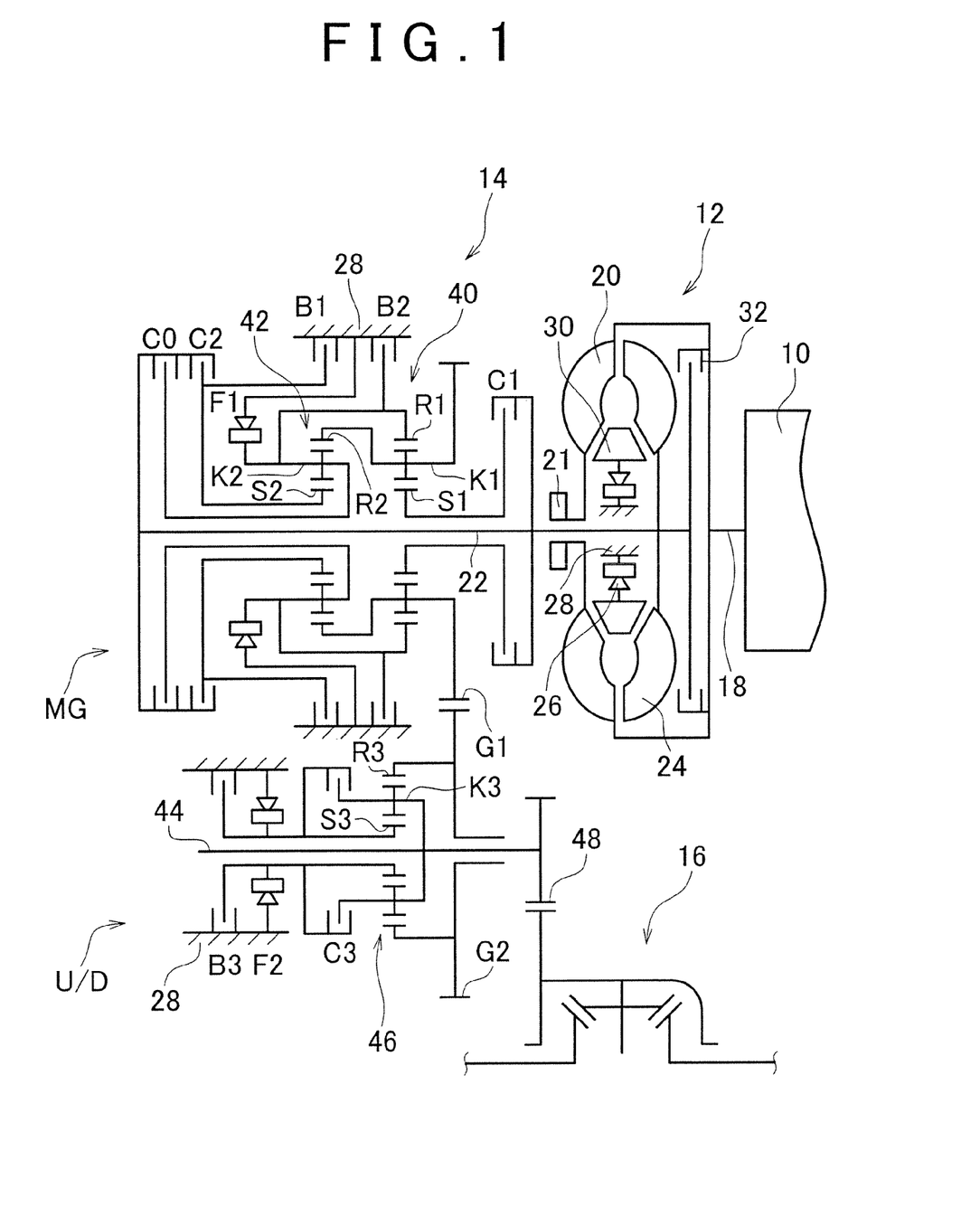
FIG. 1 is a schematic view illustrating a vehicle driving apparatus employing the present invention.

Hereinafter, embodiments of the present invention will be described in detail with reference to the accompanying drawings. FIG. 1 is a schematic view illustrating a transversely-mounted vehicle driving apparatus of an FF (front engine, front drive) vehicle. Output from an engine 10, such as a gasoline engine that generates power by combusting fuel, is transmitted to driving wheels (front wheels) via a torque converter 12, an automatic transmission 14, and a differential gear mechanism 16. The torque converter 12 is a hydraulic power-transmission device that transmits power through fluid. The torque converter 12 includes a pump impeller 20, which is connected to a crankshaft 18 of the engine 10; a turbine impeller 24, which is connected to an input shaft 22 of the automatic transmission 14; a stator 30, which is fixed to a non-rotatable housing 28 via a one-way clutch 26; and a lock-up clutch 32, which directly connects the crankshaft 18 with the input shaft 22 via a damper (not shown). A mechanical oil pump 21, such as a gear pump, is connected to the pump impeller 20. The oil pump 21 is driven together with the pump impeller 20 by the engine 10 to generate a hydraulic pressure for use in shifting, lubrication and the like. The engine 10 is a motive power source for the vehicle.

The lock-up clutch 32 is a hydraulically-operated friction clutch which is frictionally engaged due to the pressure difference ΔP between the hydraulic pressure in an engagement side oil chamber and in a disengagement side oil chamber. When the lock-up clutch 32 is fully engaged, the pump impeller 20 and the turbine impeller 24 rotate integrally with each other. Also, by controlling the pressure difference ΔP, i.e., an engagement torque in a feedback manner such that the lock-up clutch 32 is engaged in a predetermined slip state, the turbine impeller 24 may be rotated in accordance with the rotation of the pump impeller 20 in a predetermined slip amount, e.g., of about 50 rpm, during driving. Meanwhile, during reverse input, the pump impeller 20 can be rotated in accordance with rotation of the turbine impeller 24 in a predetermined slip amount of, e.g., about −50 rpm.

The automatic transmission 14 includes a first planetary gearset 40, a second planetary gearset 42, and a third planetary gearset 46, all of which are of the single pinion type, and an output gear 48. The first planetary gearset 40 and the second planetary gearset 42 are both provided on the same axis as the input shaft 22, with a carrier of the first planetary gearset 40 coupled to a ring gear of the second planetary gearset 42 and a carrier of the second planetary gearset 42 coupled to a ring gear of the first planetary gearset 40, such that the first planetary gearset 40 and the second planetary gearset 42 together form a so-called CR-CR (carrier-ring-carrier-ring) coupled planetary gear mechanism. The third planetary gearset 46 is provided on the same axis as a countershaft 44 which is parallel with the input shaft 22. The output gear 48 is fixed to one end of the countershaft 44 and is meshed with the differential gear mechanism 16. The structural elements of each of the first planetary gearset 40, the second planetary gearset 42, and the third planetary gearset 46, i.e., a sun gear, the ring gear, and the carrier that rotatably support the planetary gears which mesh with the sun gear and the ring gear, can either be selectively coupled together by four clutches C0, C1, C2, and C3, or selectively coupled to the housing 28, which is an non-rotatable member, by three brakes B1, B2, and B3. Further, two one-way clutches F1 and F2, respectively, enable a carrier K2 and a sun gear S3 to either rotate in a given direction with respect to the housing 28, or engage with the housing 28. Because the differential gear mechanism 16 is symmetrical with respect to the axis (drive axles), the bottom half thereof will be omitted.

The set of first planetary gearset 40 and the second planetary gearset 42 on the same axis as the input shaft 22, together with the clutches C0, C1, C2, the brakes B1 and B2, and the one-way clutch F1 make up a primary transmitting portion MG capable of four forward gear steps and one reverse gear step. The third planetary gearset 46 on the same axis as the countershaft 44, together with the clutch C3, the brake B3, and the one-way clutch F2 make up a secondary transmitting portion, i.e., an under drive portion U/D. In the primary transmitting portion MG, the input shaft 22 is coupled to a carrier K2 of the second planetary gearset 42 via the clutch C0, a sun gear S1 of the first planetary gearset 40 via the clutch C1, and a sun gear S2 of the second planetary gearset 42 via the clutch C2. A ring gear R1 of the first planetary gearset 40 is connected to the carrier K2 of the second planetary gearset 42, and a ring gear R2 of the second planetary gearset 42 is connected to a carrier K1 of the first planetary gearset 40. The sun gear S2 of the second planetary gearset 42 is coupled to the housing 28 via the brake B1, and the ring gear R1 of the first planetary gearset 40 is coupled to the housing 28 via the brake B2. Moreover, the one-way clutch F1 is provided between the carrier K2 of the second planetary gearset 42 and the housing 28. A first counter gear G1, which is fixed to the carrier K1 of the first planetary gearset 40, is in mesh with a second counter gear G2, which is fixed to the ring gear R3 of the third planetary gearset 46. In the under drive portion U/D, a carrier K3 and a sun gear S3 of the third planetary gearset 46 are coupled together via the clutch C3. Also, in the under drive portion U/D, the brake B3 and the one-way clutch F2 are provided in parallel between the sun gear S3 and the housing 28.

Figure 2:
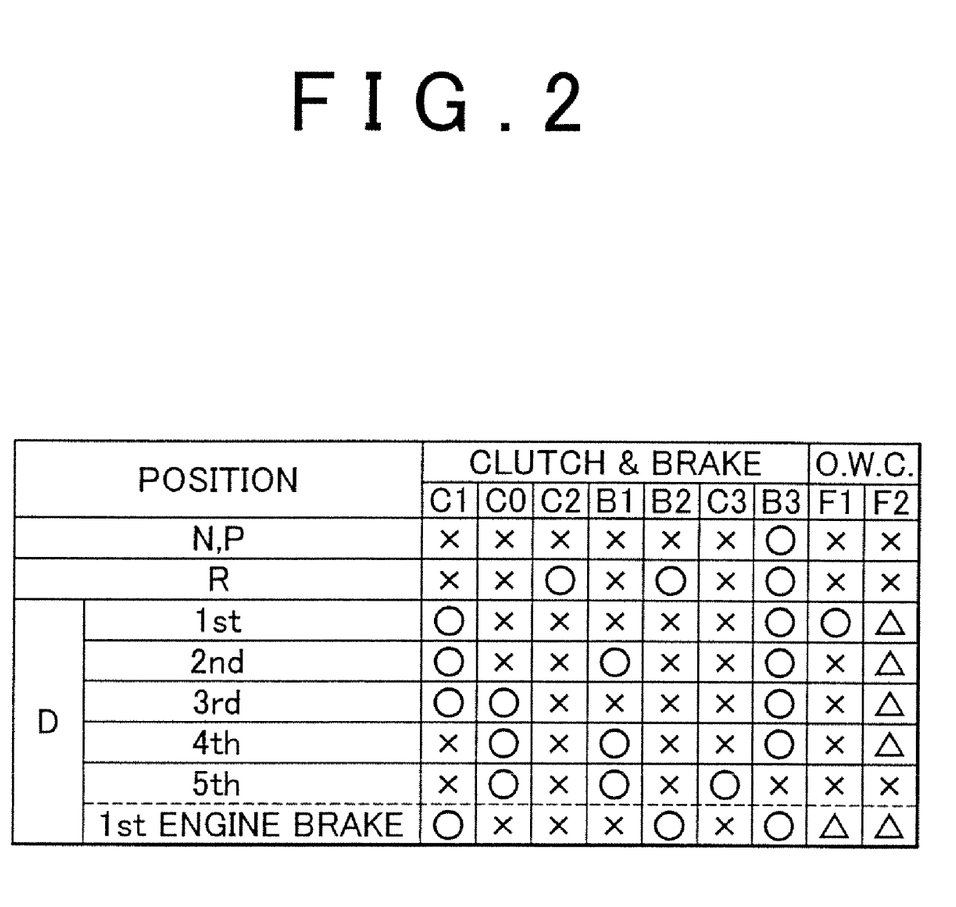
FIG. 2 is a table illustrating a relationship between operational combination of a plurality of hydraulically-operated frictional coupling devices in an automatic transmission in FIG. 1 and gear steps achieved by the operational combination.

The clutches C0, C1, C2, and C3 and the brakes B1, B2, and B3 (hereinafter, simply referred to as "clutches C" and "brakes B", respectively, when not specified further) are hydraulically-operated frictional coupling devices, the clutches C being, e.g., multi-plate clutches and the brakes B being, e.g., band brakes which are controlled by hydraulic actuators. These clutches C and brakes B are switched between an applied state and a released state, as shown in FIG. 2, for example, by switching linear solenoids SL1, SL2, SL3, and SLT and solenoids DSL, S4, and SR of a hydraulic circuit 98 (see FIG. 3) between an energized state and a de-energized state, or by switching a hydraulic circuit using a manual valve, not shown. Each gear step, i.e. five forward gear steps, one reverse gear step, and a neutral gear step, is achieved according to a position of a shift lever 72 (see FIG. 3). The denotations "1st" to "5th" in FIG. 2 denote the first forward gear step to the fifth forward gear step, respectively. A gear ratio γ (=input rotational speed NIN/output rotational speed $N_{OUT}$) becomes smaller from the first gear step "1st" to the fifth gear step "5th". In the figure, a circle indicates an applied state, an "X" indicates a released state, and a triangle indicates an applied state which is not related to power transmission. The shift lever 72 is operated in a shift pattern which indicates a park position "P", a reverse drive position "R", a neutral position "N", and forward drive positions "D", "4", "3", "2", and "L", as shown in FIG. 4. When the shift lever 72 is in the "P" or the "N" position, the transmission is in a neutral gear step. i.e. a non-driving gear step in which the transmission of power to the wheels is interrupted. When the shift lever 72 is in the "P" position, the driving wheels are mechanically prevented from rotating by a mechanical parking brake, not shown.

In FIG. 2, in each of the second gear step "2nd" to the fifth gear step "5th", the engine brake is applied by transmitting the reverse input from the driving wheel to the engine 10. Shifting among these gear steps is achieved by so-called clutch-to-clutch shifting for disengaging one of the two frictional coupling devices while engaging the other. For example, 3→4 shifting or 4→3 shifting between the third gear step "3rd" and the fourth gear step "4th" is achieved by disengaging the clutch C1 and applying the brake B1, or by releasing the brake B1 and engaging the clutch C1. Even in the first gear step "1st", the engine brake is applied by applying the brake B2. In this case, shifting between the first gear step "1st" and the second gear step "2nd" is performed by clutch to clutch shifting.

Figure 3:
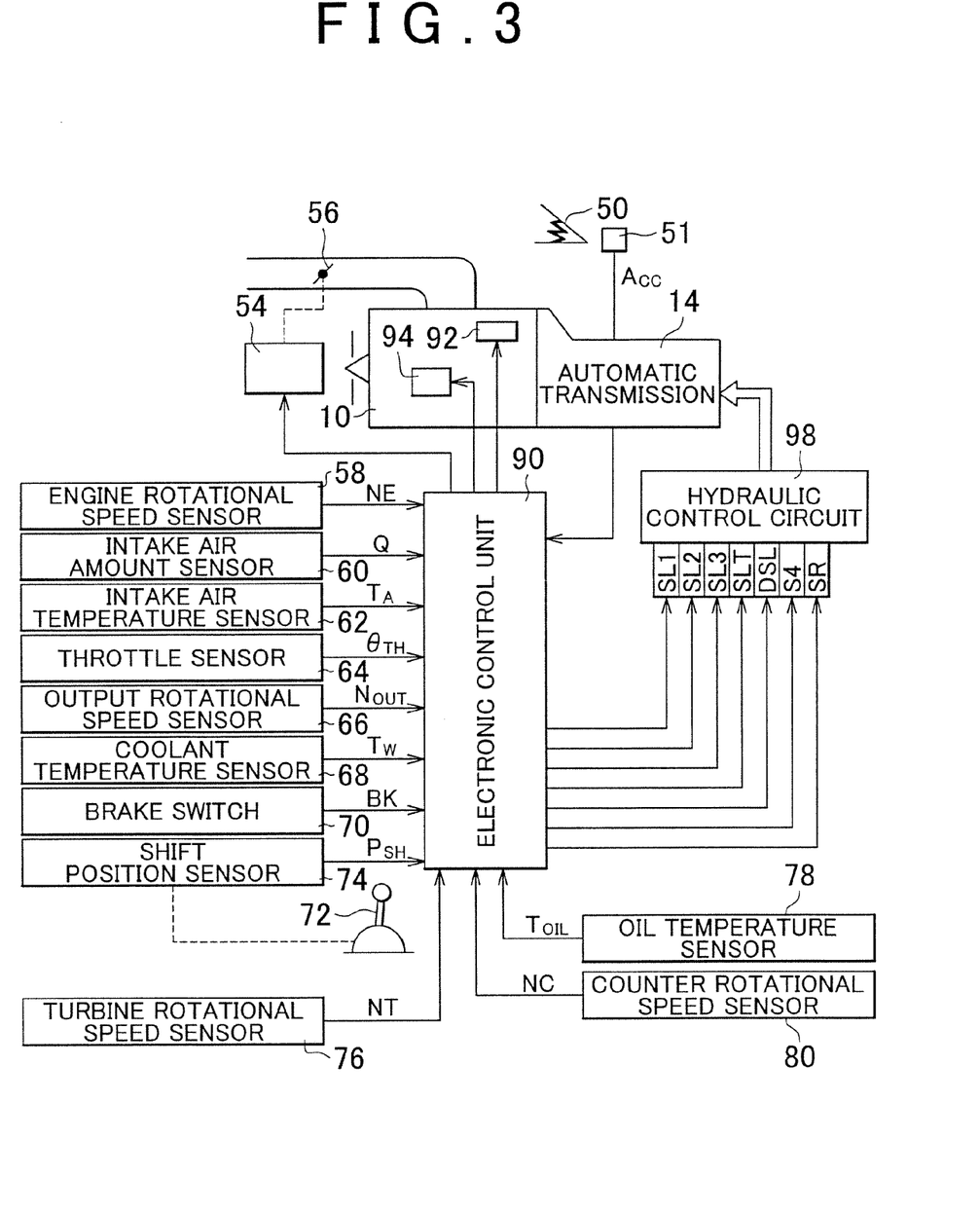
FIG. 3 is a block diagram illustrating a main portion of a control system of the vehicle driving apparatus in FIG. 1.
Figure 4:
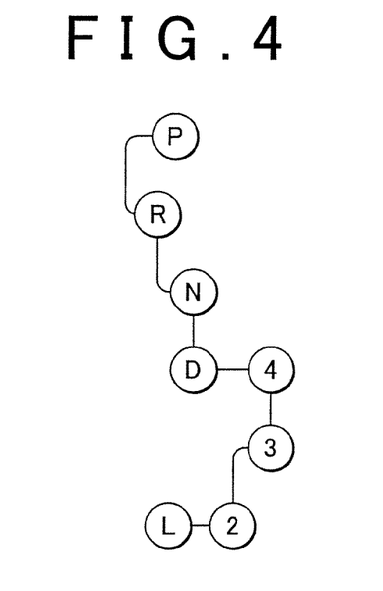
FIG. 4 is a view illustrating shift positions of a shift lever in FIG. 3.

FIG. 3 is a block diagram illustrating a control system provided in a vehicle to control the engine 10 and the automatic transmission 14 in FIG. 1. According to this control system, the operation amount $A_{cc}$ of an accelerator pedal 50 is detected by an accelerator operation amount sensor 51. The accelerator pedal 50 is an embodiment of an accelerator operating member and is depressed in accordance with the amount of acceleration desired by a driver. Thus, the accelerator pedal operation amount $A_{cc}$ indicates the amount of acceleration required. An electronic throttle valve 56 is provided in an intake manifold of the engine 10. A throttle actuator 54 adjusts the opening amount of the electronic throttle valve 56 to an opening angle (opening degree) $\theta_{TH}$ in accordance with the accelerator pedal operation amount $A_{cc}$. In addition, other sensors and switches are also provided, such as: an engine rotational speed sensor 58 that detects the engine rotational speed NE of the engine 10; an intake air amount sensor 60 that detects the intake air amount Q of the engine 10; an intake air temperature sensor 62 that detects the temperature $T_A$ of the intake air; a throttle sensor 64 with an idle switch, that detects whether the electronic throttle valve 56 is fully closed (i.e., idle state) as well as detects the opening degree $\theta_{TH}$ of the electronic throttle valve 56; an output rotational speed sensor 66 that detects the output rotational speed $N_{OUT}$ of the countershaft 44 (which corresponds to the vehicle speed V); a coolant temperature sensor 68 that detects the temperature $T_W$ of coolant of the engine 10; a brake switch 70 that detects the operation of the brake; a shift position sensor 74 that detects the shift position (i.e., an operating position) $P_{SH}$ of the shift lever 72; a turbine rotational speed sensor 76 that detects the turbine rotational speed NT (=input rotational speed); an AT oil temperature sensor 78 that detects the AT oil temperature $T_{OIL}$, which is the temperature of the operating oil within the hydraulic control circuit 98; and a counter gear rotational speed sensor 80 that detects the rotational speed NC of the first counter gear G1. The sensors send signals indicating the engine rotational speed NE, the intake air amount Q, the intake air temperature $T_A$, the throttle valve opening degree $\theta_{TH}$, the output rotational speed $N_{OUT}$, the engine coolant temperature $T_W$, an operation state BK of the brake, the shift position $P_{SH}$ of the shift lever 72, the turbine rotational speed NT, the AT oil temperature $T_{OIL}$, and the counter gear rotational speed NC to an electronic control unit 90.

Figure 5:
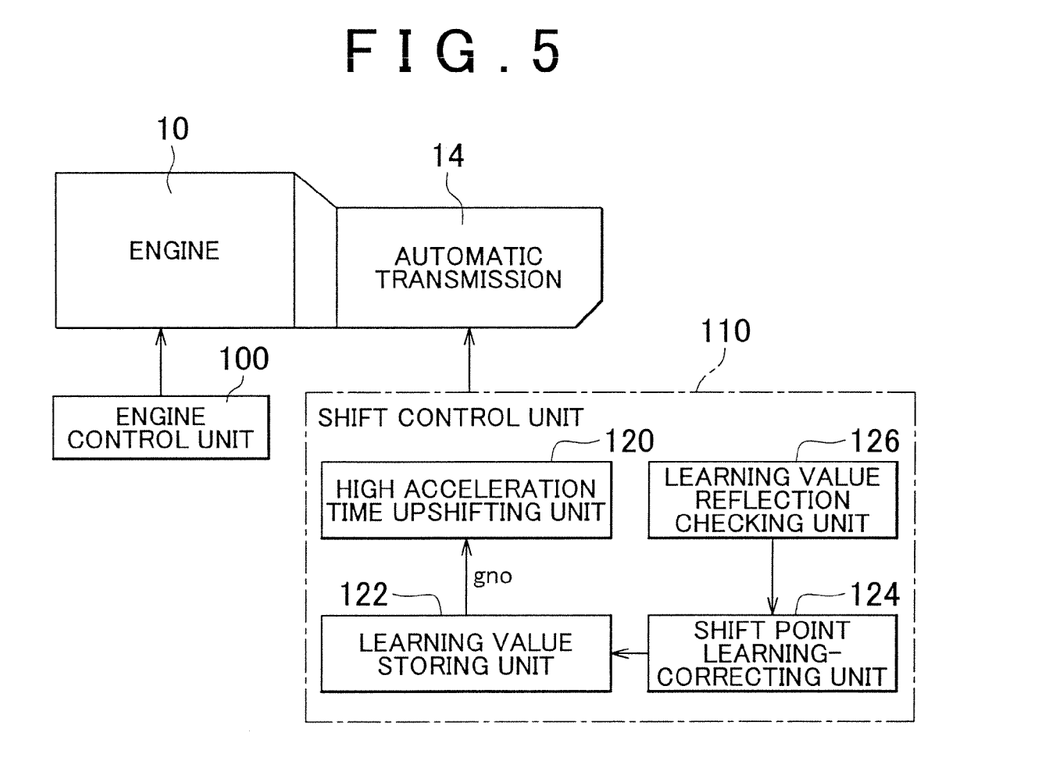
FIG. 5 is a block diagram illustrating a main function of an electronic control unit in FIG. 3.

The electronic control unit 90 includes at least a microcomputer that has a CPU, RAM, ROM, an input/output interface. The CPU controls. For example, the output of the engine 10, the shifting of the automatic transmission 14, the slip control of the lock-up clutch 32 by processing signals according to a program stored in the ROM beforehand while using the temporary storage function of the RAM. When necessary, the electronic control unit 90 may be configured with a separate engine control unit and a separate shift control unit. FIG. 5 is a block diagram illustrating a main function performed by the electronic control unit 90 through the signal processing. The electronic control unit 90 includes an engine control unit 100 and a shift control unit 110.

Figure 6:
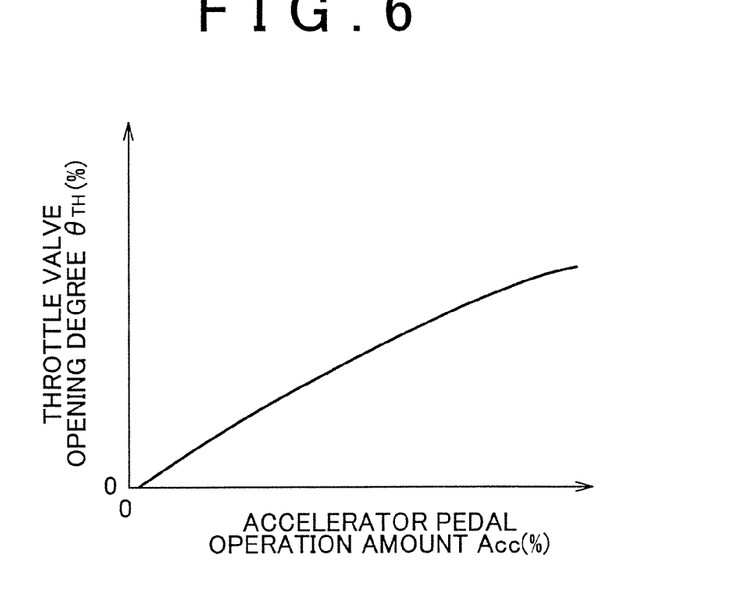
FIG. 6 is a graph illustrating a relationship between an opening degree of an electronic throttle valve controlled by an engine control unit in FIG. 5 and an accelerator operation amount.

The engine control unit 100 basically controls the power output of the engine 10. The engine control unit 100 controls the throttle actuator 54 to operate the electronic throttle valve 56, the amount of fuel that is injected by a fuel injection device 92, and an ignition device 94, such as an igniter, to control the ignition timing. In the control of the electronic throttle valve 56, for example, the throttle actuator 54 is driven based on the actual accelerator pedal operation amount $A_{cc}$ according to the relationship shown in FIG. 6, and the throttle valve opening degree $\theta_{TH}$ increases as the accelerator pedal operation amount $A_{cc}$ increases.

Figure 7:
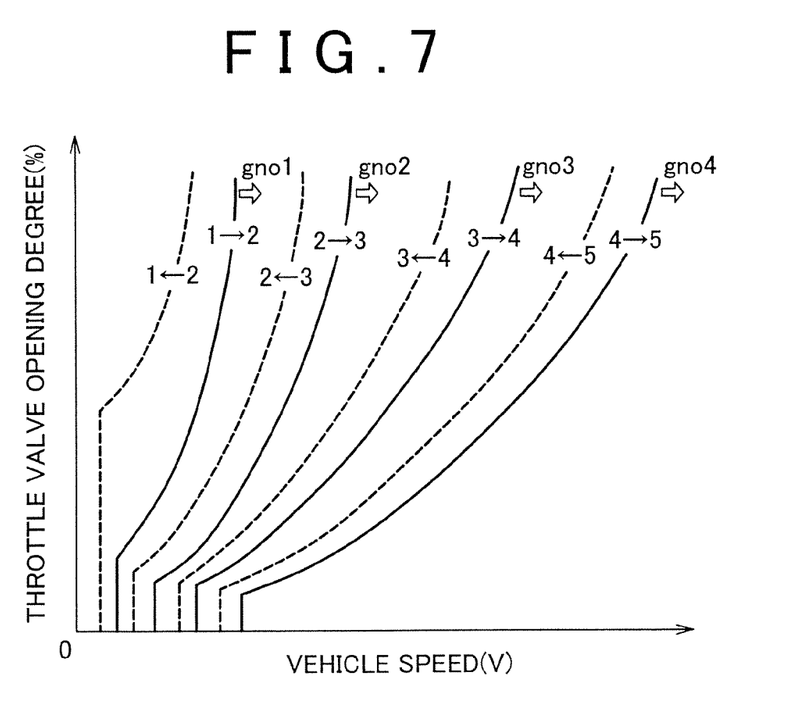
FIG. 7 is a graph illustrating an example of a shift map for use in automatically changing the gear steps of the automatic transmission by the shift control apparatus in FIG. 5 based on an operational status.

The shift control unit 110 executes the shift control of the automatic transmission 14 according to the shift positions $P_{SH}$ of the shift lever 72. For example, when the shift lever 72 is at the "D" position, shift control is performed using all the forward gear steps, which are the first gear step "1st" to the fifth gear step "5th". In the shift control, the appropriate gear step of the automatic transmission 14 is determined based on the actual throttle valve opening degree $\theta_{TH}$ and the vehicle speed V, according to, for example, the shift map shown in FIG. 7. Then, the solenoids DSL, S4, and SR of the hydraulic control circuit 98 are switched between ON (energized state) and OFF (de-energized state), or the energized/de-energized states of the linear solenoids SL1, SL2, SL3, and SLT are continuously changed through duty control or the like, such that the appropriate gear step is achieved. The linear solenoids SL1, SL2, and SL3 may directly control the hydraulic pressures at which the brake B1, the clutch C0 and the clutch C1 are applied, respectively. The linear solenoids SL1, SL2, and SL3 adjust the hydraulic pressures to minimize the occurrence of a shift shock, for example a change in the driving power, or durability of the friction member is not impaired. In FIG. 7, solid lines are upshift lines, and dashed lines are downshift lines. As the vehicle speed V decreases or the throttle valve opening degree $\theta_{TH}$ increases, the gear step is changed to a lower gear step where the gear ratio γ is large. The shift map corresponds to a reference value of the shift point for use in determining whether to perform shift control. Further, a plurality of shift maps may be prepared according to drive modes such as a power mode, a normal mode, and the like. In FIG. 7, the first gear step "1st" to the fifth gear step "5th" are denoted by reference numerals "1" to "5", respectively.

The shift control unit 110 executes an upshift by increasing the engine rotational speed NE as high as possible when a driver requests high acceleration, that is, when the throttle valve opening degree $\theta_{TH}$ which is controlled according to the accelerator pedal operation amount $A_{cc}$, corresponds to a fully open state, i.e., equal to or greater than, 80%, for example. For this purpose, the shift control unit 110 includes a high acceleration time upshifting unit 120, a learning value storing unit 122, a shift point learning-correcting unit 124, and a learning value reflection checking unit 126. The shift point learning-correcting unit 124 corrects the upshift line indicated by the solid line in FIG. 7, i.e., reference values of shift points, toward a higher vehicle speed side such that the turbine rotational speed NT, which is the input rotational speed of the automatic transmission 14, reaches a predetermined target maximum rotational speed. As such, a learning value gno stored in the learning value storing unit 122 is updated repeatedly. The learning value gno is stored for each type of upshifting from one gear step to another gear step. The learning-correction of the shift points may be implemented, for example, similarly to the learning-correction method described in Japanese Patent Application Publication No. 2004-218799, by calculating a virtual maximum rotational speed, which is a maximum rotational speed of a turbine when a turbine rotational speed changes at a predetermined reference rotational speed change rate, using the turbine rotational speed (input rotational speed) at issuing of an upshift command, a lag time from the issuing of the upshift command to a starting of an inertia phase, and the reference rotational speed change rate, and performing, when the high acceleration is requested, learning-correction of the shift point (vehicle speed) such that the virtual maximum rotational speed comes close to the target maximum rotational speed. However, several other ways to perform a learning-correction of the shift point directly or indirectly are possible. For, example, the learning-correction of the shift point may be performed by using an actual change rate of the input rotational speed as a parameter or by learning the ineffective time to correct the shift point indirectly.

The shift point is a rotational speed for use in determining whether to perform the upshift. The shift point is, for example, a vehicle speed or an input rotational speed having a specific relationship with the vehicle speed, and reference value of the shift point is predetermined by using a driving power source load (output) such as the opening degree of the throttle valve as a parameter. When the high acceleration is not requested, the shift control is performed based on the reference value. However, when the high acceleration is requested, the shift control is performed by the high acceleration time upshifting unit.

Figure 8:
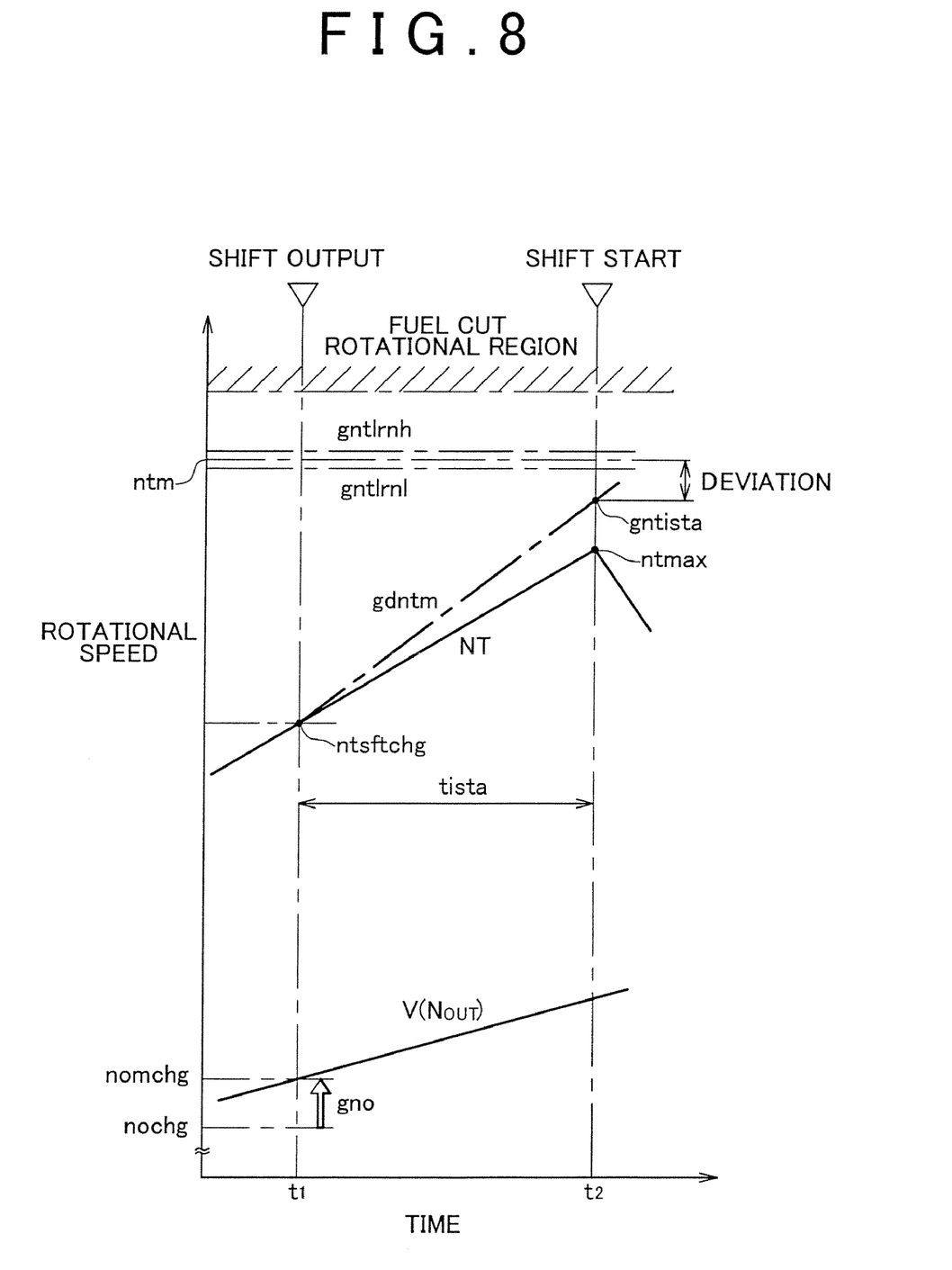
FIG. 8 is an example of a timing chart representing an operation status of respective units during an upshift performed by a high acceleration upshifting unit, particularly, illustrating learning-correction of a shift point nomchg performed by a shift point learning-correcting unit in detail.

FIG. 8 is a timing chart illustrating an example of learning-correction performed by the shift point learning-correcting unit 124 in detail, when the upshift control is performed by the high acceleration time upshifting unit 120 based on a fully open time shift point nomchg. The shift point nomchg is obtained by adding the learning value gno to a predetermined reference value nochg of the shift point (see the shift map in FIG. 7). First, the delay between time $t_1$, when the actual turbine rotational speed NT reaches the fully open time shift point nomchg and a shift output for an upshift is generated (a hydraulic control is started), and time $t_2$, when actual shift is started (an inertial phase is started), that is, time $t_2-t_1$, is obtained as an lag time tista. Then, a virtual maximum rotational speed gntista is calculated according to Equation 1 using the turbine rotational speed ntsftchg when the shift output is generated (at the time t1), the lag time tista, and a predetermined reference rotational speed change rate gdntm:

$$gntista = ntsftchg + (tista \times gdntm). \qquad \text{Equation 1}$$

The virtual maximum rotational speed gntista is the maximum rotational speed of the turbine when the turbine rotational speed NT changes at the predetermined reference rotational speed change rate gdntm. The learning-correction of the shift point nomchg is performed such that the virtual maximum rotational speed gntista substantially reaches a predetermined target maximum rotational speed ntm. The target maximum rotational speed ntm is the highest rotational speed within a range where the engine 10 does not overrun. Thus, a high acceleration driving is allowed. The reference rotational speed change rate gdntm is a change rate of the turbine rotational speed NT after the shift output is generated. The reference rotational speed change rate gdntm is set to a constant value for each type of upshifting based on the rotational speed change due to the torque phase or the like, on the assumption that the vehicle is running, on a flatland at the high acceleration, such as with the accelerator fully depressed. However, in order to prevent the turbine rotational speed NT and also the engine rotational speed NE from excessively increasing on a downhill slope or the like, the reference rotational speed change rate gdntm is set to a high value in order to secure a certain level of safety, or the target maximum rotational speed gdntm is set to a low value in order to secure a certain level of safety. Also, the reference rotational speed change rate gdntm can be set using a slope of a road as a parameter. The lag time tista changes according to the viscosity of the operating oil, i.e., the AT oil temperature $T_{OIL}$. In accordance with the change in the lag time, the virtual maximum rotational speed gntista changes. Therefore, it is preferable that the reference value nochg of the shift point and the learning value gno be set using the AT oil temperature $T_{OIL}$ as a parameter.

After that, it is determined whether the virtual maximum rotational speed gntista is within a learning dead zone where the learning-correction of the shift point nomchg does not need to be performed, by determining whether the virtual maximum rotational speed gntista is within a range between an upper limit rotational speed gntlrnh and a lower limit rotational speed gntlrnl. The upper limit rotational speed gntlrnh is set to a value above the target maximum rotational speed ntm, and the lower limit rotational speed gntlrnl is set to a value below the target maximum rotational speed ntm. When the virtual maximum rotational speed gntista is not in the learning dead zone, a correction amount gdno is calculated according to Equation 2 based on the deviation between the target maximum rotational speed ntm and the virtual maximum rotational speed gntista (ntm−gntista) using the predetermined coefficient. In Equation 2, γ is the gear ratio before upshifting. Then, a guard process for limiting the correction amount gdno within a predetermined range is performed. A new learning value gno is calculated by adding the correction amount gdno to the present learning value gno and a guard process for limiting the learning value gno within a predetermined range is performed. After that, the learning value gno stored in the learning value storing unit 122 is updated to the new value. On the other hand, when the virtual maximum rotational speed gntista is in the learning dead zone, the learning-correction ends. Due to this operation, gear hunting (slight up-and-down fluctuation) at the shift point nomchg due to a slight difference between the virtual maximum rotational speed gntista and the target maximum rotational speed ntm can be prevented:

$$gdno = \text{coefficient} \times (ntm - gntista)/\gamma. \qquad \text{Equation 2}$$

Further, during the upshift control, if the actual turbine rotational speed NT reaches a fuel cut region, which is predetermined in order to prevent the overrun of the engine 10, the engine 10 will be forcibly stopped by an interruption of a fuel supply to the engine 10.

The above-described shift point learning control assumes that the upshift control is performed by the high acceleration time upshifting unit 120. If the learning-correction is performed by the shift point learning-correcting unit 124 during the upshift based on the reference value nochg of the shift point shown in the shift map in FIG. 7, the virtual maximum rotational speed gntista becomes much lower than the target maximum rotational speed ntm, and thus the learning value gno is corrected by being increased to a large degree. When the upshift is performed by the high acceleration time upshifting unit 120 using the highly increased learning value gno, the turbine rotational speed NT will become excessively high and overrun, and the fuel cut control will be performed. Therefore, a shift shock may be generated, or the driving performance may be damaged.

Figure 9:
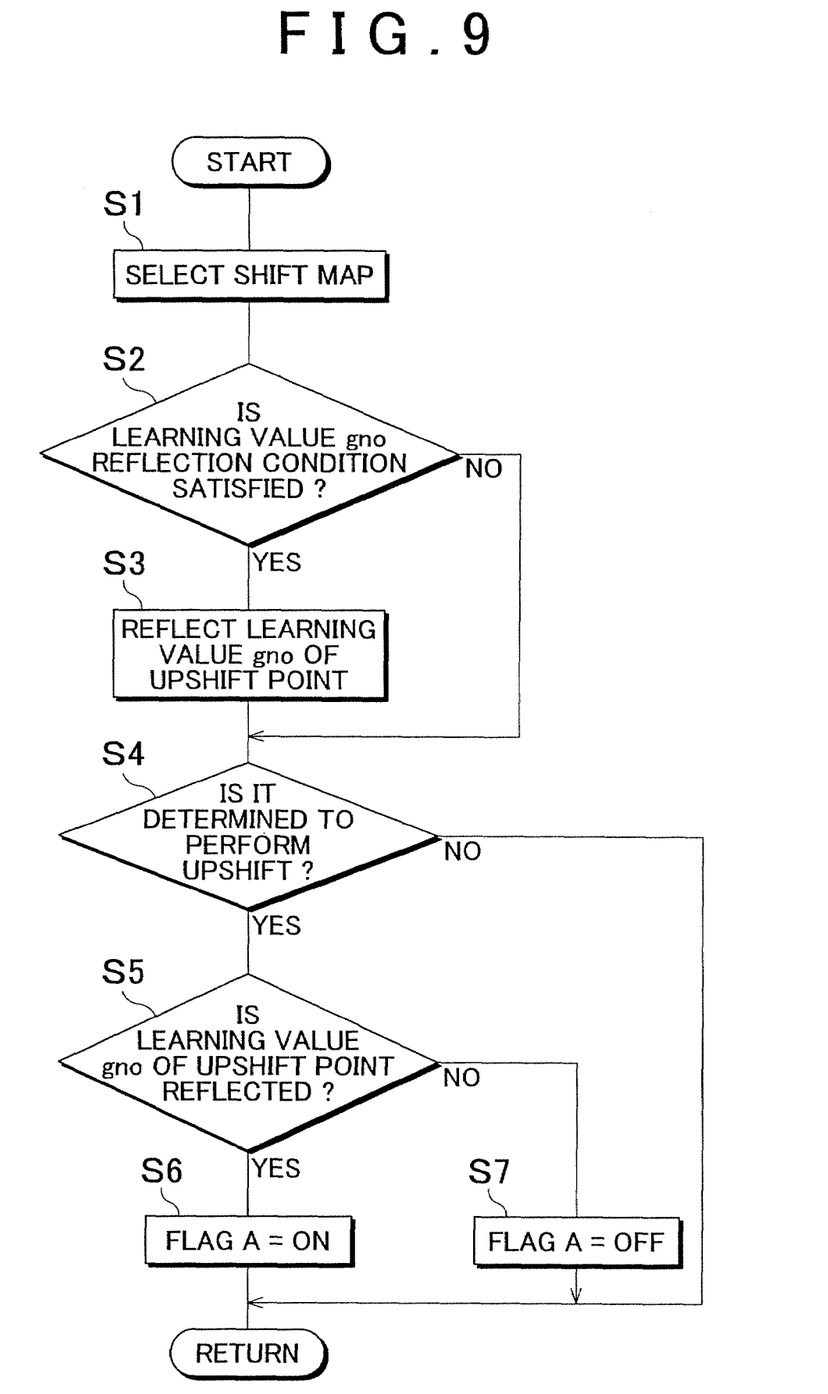
FIG. 9 is a flowchart illustrating concrete processes performed by the high acceleration upshifting unit and a learning value reflection checking unit.
Figure 10:
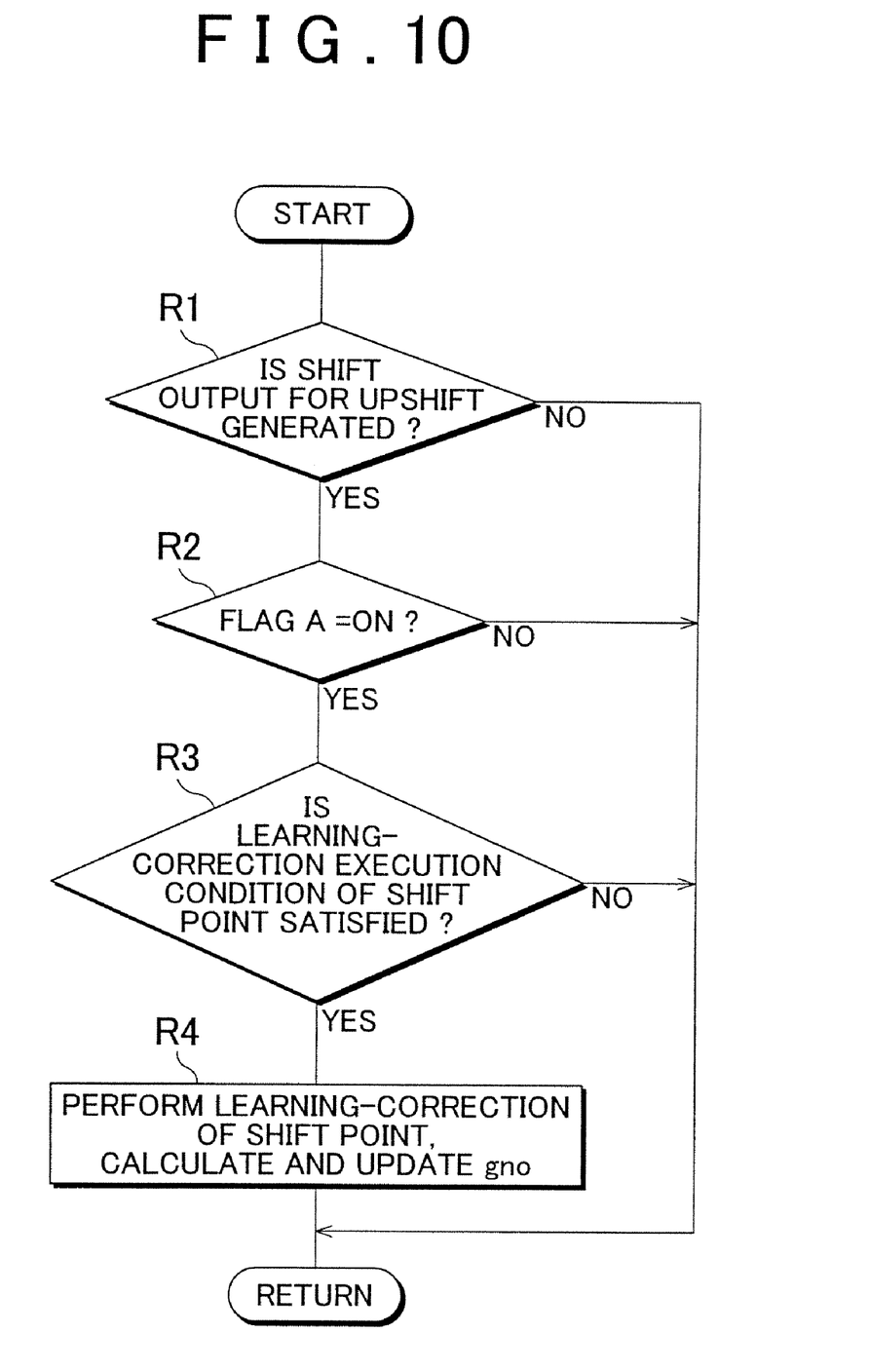
FIG. 10 is a flowchart illustrating concrete processes performed by the learning value reflection checking unit and the shift point learning-correcting unit in FIG. 5.

In the present invention, in order to prevent such inappropriate learning, the learning-correction performed by the shift point learning-correcting unit 124 is regulated by the learning value reflection checking unit 126 based on the determination whether the upshift is performed by the high acceleration time upshifting unit 120, which executes the upshift control based on the shift point in which the learning value gno is reflected. FIG. 9 is a flowchart illustrating a signal processing for switching a learning value reflection flag A based on the determination whether the shift control is performed by the high acceleration time upshifting unit 120. In FIG. 9, steps S2 and S3 correspond to operations of the high acceleration time upshifting unit 120, and steps S4 to S7 correspond to operations of the learning value reflection checking unit 126. FIG. 10 is a flowchart illustrating the signal processing for regulating the learning-correction performed by the shift point learning-correcting unit 124 based on the determination whether the shift control is performed by the high acceleration time upshifting unit 120, that is, whether the learning value reflection flag A is ON or OFF. In FIG. 10, step R2 corresponds to operation of the learning value reflection checking unit 126, and steps R3 and R4 correspond to operations of the shift point learning-correcting unit 124.

The learning value reflection checking unit 126 checks whether the learning value is reflected in various ways. For example, the learning value reflection checking unit 126 may be configured to determine whether a condition (learning value reflection condition) under which the shift control is performed by the high acceleration upshifting unit is satisfied, to read a flag that switches according to whether the shift control is performed by the high acceleration upshifting unit 120, or the like. Whether to perform learning-correction is determined based on a checking result of the learning value reflection checking unit 126. To be specific, it is preferable to add reflection of the learning value to a learning-correction execution condition or to add non-reflection of the learning value to a learning-correction inhibition condition. Further, separately from the learning-correction inhibition condition or the learning-correction execution condition, it is possible to switch between execution of the learning-correction and non-execution of the learning-correction according to the checking result of the learning value reflection checking unit 126.

In step S1 of FIG. 9, the shift map is selected according to the drive mode, such as the power mode, the normal mode, and the like. In step S2, it is determined whether the learning value reflection condition, under which the learning value gno stored in the learning value storing unit 122 is reflected in the shift control, is satisfied. That is, it is determined whether the shift control is executed by the high acceleration time upshifting unit 120. As the learning value reflection condition, various conditions other than the fully open state of the throttle valve opening degree $\theta_{TH}$, i.e., equal to or greater than 80%, for example, may be set. For example, an automatic shifting mode like a D range, the AT oil temperature $T_{OIL}$ equal to or higher than a predetermined value, non-operation of the ABS (Antilock Brake System) or the VSC (Vehicle Stability Control), and the like may be set as the learning value reflection condition. When the learning value reflection condition is not satisfied, step S4 is executed without reflecting the learning value gno. However, when the learning value reflection condition is satisfied, step S3 is executed. In step S3, the learning value gno stored in the learning value storing unit 122 is read, and the fully open time shift point nomchg is calculated by adding the learning value gno to the reference value nochg of the upshift point. The reference value nochg of the shift point is the vehicle speed when the throttle valve is fully open on the upshift lines indicated by the solid lines in FIG. 7.

In step S4, it is determined whether the shift is performed based on the shift map (reference value) shown in FIG. 7 or the shift point nomchg in which the learning value gno, obtained in step S3, is reflected. According to this determination, the shift control is performed. When the determination to perform the upshift has been made, the process proceeds to step S5. That is, if the fully open time shift point nomchg has been calculated in step S3, the upshift control is performed based on the fully open time shift point nomchg. Meanwhile, if the learning value reflection condition has not been satisfied in step S2, the upshift or downshift control is performed according to the shift map (reference value) shown in FIG. 7. Even though the shift point nomchg in which the learning value gno is reflected has been obtained in step S3, when the vehicle speed V is decreased on an upward slope or the like, the downshift control is performed based on the downshift line indicated by the dashed line in FIG. 7.

In step S5, which is executed when the determination to perform the upshift, it is determined whether the upshift is based on the shift point nomchg in which the learning value gno is reflected. If it is determined that the upshift is performed based on the shift point nomchg, in which the learning value gno is reflected, the learning value reflection flag A is set to ON in step S6. On the other hand, if it is determined that the upshift is not performed based on the shift point nomchg, in which the learning value gno is reflected, that is, when it is determined that the upshift is based on the shift map (reference value) shown in FIG. 7, the learning value reflection flag A is set to OFF in step S7. The determination in step S5, i.e., the determination whether the upshift is based on the shift point nomchg in which the learning value gno is reflected, may be performed by determining whether the learning value reflection condition is satisfied as in step S2. Alternatively, a flag that switches between ON and OFF according to the determination result in step S2 may be used.

In step R1 of the flowchart shown in FIG. 10, it is determined whether a shift output (hydraulic control for changing the gear speed) has been generated according to the determination that to perform the upshift. If the shift output has been generated, steps following step R2 are executed. In step R, it is determined whether the learning value reflection flag A is ON. If the learning value reflection flag A is ON, that is, if the upshift is performed based on the shift point nomchg, in which the learning value gno is reflected, the learning-correction in steps R3 and R4 are executed. However, if the learning value reflection flag A is OFF, that is, in case of a general upshift in which the learning value gno is not reflected, the process ends without executing the learning-correction in the steps R3 and R4.

In step R3, it is determined whether the learning-correction execution condition of the shift point at the high acceleration time is satisfied. If the learning-correcting execution condition is satisfied, the learning value gno of the shift point is updated in step R4. The learning-correcting execution condition includes that the virtual maximum rotational speed gntista is deviated from the learning dead zone so that the correction of the learning value gno is required. The learning-correcting execution condition also includes the learning-correcting inhibition condition, such as a single shift, non-occurrence of an abnormal shift such as a tie-up or the like, for example. In step R4, the correction amount gdno, which corresponds to the deviation between the target maximum rotational speed ntm and the virtual maximum rotational speed gntista (ntm−gntista), is calculated according to Equation 2. The learning value gno is corrected by adding the correction amount gdno thereto, and the learning value gno stored in the learning value storing unit 122 is overwritten by the new learning value gno.

In accordance with the shift control apparatus of the embodiment, it is determined whether the up-shift is performed by the high acceleration time upshifting unit 120 based on the shift point nomchg in which the learning value gno is reflected (YES in step S4) when the determination to perform the upshift has been made (step S5). When the upshift is performed by the high acceleration time upshifting unit 120, the learning value reflection flag A is set to ON by the learning value reflection checking unit 126 (step S6). Further, only when the determination in step R2, i.e. whether the learning value reflection flag A is ON, is YES (positive), the learning-correction of the shift point nomchg by the shift point learning-correcting unit 124 (steps R3 and R4) is allowed. Therefore, inappropriate learning caused by the mismatch between the reflection of the learning value gno in the shift control and the learning-correction of the shift point nomchg is prevented, and an overrun of the turbine rotational speed NT caused by the inappropriate learning may also be prevented. Also, the fuel cut control of the engine 10 due to the overrun is performed, thereby preventing generation of the shift shock or damage on the driving performance.

Further, the shift control apparatus of the present invention may include the learning value reflection checking unit 126 which determines whether the learning value gno is reflected in the upshift control based on whether the learning value reflection flag A is ON or OFF. If the determination in step R2 is NO (negative), because the learning value reflection flag A is OFF, i.e., the learning value gno is not reflected in the upshift control, the learning-correction is not executed after step R3. Therefore, inappropriate learning caused by the mismatch between the reflection of the learning value gno in the shift control and the learning-correction of the shift point nomchg is prevented.

However, the learning value reflection checking unit 126 is not required. Embodiments of the invention may be configured such that the learning value reflection condition under which the shift control is performed by the high acceleration upshifting unit 120 may be simply added to the learning-correction execution condition without checking. Further, the learning value reflection condition may be identical to the learning-correction execution condition.

Furthermore, it is determined whether the upshift determination has been made in step S4, and the steps following step S5 are executed each time the upshift determination is made. In step S5, it is determined whether the learning value gno is reflected in the upshift control, and according to this, the learning value reflection flag A is switched ON or OFF. Therefore, inappropriate learning caused by the mismatch between the reflection of the learning value gno in the shift control and the learning-correction of the shift point nomchg is prevented.

The embodiment of the invention is described in conjunction with a stepped transmission such as a planetary gear transmission in which the input rotational speed increases during a delay time (lag time) until the shifting is actually performed after determining to perform the upshift using the shift point. However, the present invention can be also applied to a continuously variable transmission, such as a belt transmission, in which a gear ratio varies step by step, as in the stepped transmission.

While the invention has been shown and described with respect to example embodiments, it will be understood by those skilled in the art that various changes and modifications may be made without departing from the scope of the invention as defined in the following claims.

What is claimed is:

1. A shift control apparatus of an automatic transmission, comprising:
a shift point learning-correcting unit that executes learning-correction of a shift point during an upshift such that an input rotational speed of the automatic transmission reaches a predetermined target maximum rotational speed;
a high acceleration time upshifting unit that executes, when predetermined high acceleration is requested, an upshift control based on the shift point in which a learning value of the shift point learning-correcting unit is reflected; and
a determining unit that determines whether the learning value is reflected in the upshift control when the upshift is performed, wherein
when the high acceleration is not requested, the upshift control is executed based on a reference value of the shift point, which does not reflect the learning value of the shift point learning-correcting unit, and
the shift point learning-correcting unit executes the learning-correction of the shift point when it is determined that the learning value is reflected.

2. The shift control apparatus according to claim 1, further comprising:
a learning value reflection checking unit that determines whether the learning value is reflected in the upshift control,
wherein, when the learning value reflection checking unit determines that the learning value is not reflected in the upshift control, the shift point learning-correcting unit is prohibited from executing the learning-correction of the shift point.

3. The shift control apparatus according to claim 2, wherein the learning value reflection checking unit determines whether the learning value is reflected in the upshift control each time the upshift control is executed.

* * * * *